United States Patent [19]

Hirata

[11] Patent Number: 4,483,811
[45] Date of Patent: Nov. 20, 1984

[54] PRODUCTION OF ELECTRODE BODY

[75] Inventor: Kozi Hirata, Yamaguchi, Japan

[73] Assignee: Hitachi, Ltd., Tokyo, Japan

[21] Appl. No.: 513,100

[22] Filed: Jul. 12, 1983

Related U.S. Application Data

[63] Continuation-in-part of Ser. No. 332,762, Dec. 21, 1981, abandoned.

[30] Foreign Application Priority Data

Dec. 26, 1980 [JP] Japan ................. 55-183893

[51] Int. Cl.$^3$ .............................................. B29C 6/04
[52] U.S. Cl. .................... 264/162; 264/272.13; 264/272.16; 264/275; 264/328.8; 264/328.12; 445/46
[58] Field of Search ............. 264/272.11, 272.13, 264/272.15, 272.17, 275, 328.8, 328.12, 279.1, 272.16, 162; 445/46

[56] References Cited

U.S. PATENT DOCUMENTS 2,850,687  9/1958  Hammet ................ 264/272.17
3,626,051 12/1971  Liautand ................ 264/328.8
3,947,953  4/1976  Okada et al. .......... 264/272.17
4,083,903  4/1978  Gilbert et al. ......... 264/328.8

FOREIGN PATENT DOCUMENTS 51-20225  6/1976  Japan ................. 264/272.13
54-23995  2/1979  Japan .

Primary Examiner—James Lowe
Attorney, Agent, or Firm—Antonelli, Terry & Wands

[57] ABSTRACT

Disclosed is a method of production of an electrode body formed by injecting polyphenylene sulfide resin into a metal mold containing a conductive member of small diameter to cause the molded resin to adhere to the outer periphery of the conductive member, for use in electrically preventing corrosion of a can body of a water heater or measuring the liquid level therein. Injection gates are arranged in over two positions substantially equidistantly spaced apart from each other and located substantially parallel to the conductor member and substantially on the circumference of an imaginary circle centered at the conductive member. The conductive member comprises titanium wires subjected to sandblast treatment to have a surface roughness of 15–34 μm and then to cleansing treatment. No coupling agent is used, to prevent water from leaking between the polyphenylene sulfide resin and the conductive member.

9 Claims, 5 Drawing Figures

PRODUCTION OF ELECTRODE BODY

CROSS REFERENCE TO THE RELATED APPLICATION

This is a Continuation-in-Part of U.S. Ser. No. 332,762 filed Dec. 21, 1981 and now abandoned.

BACKGROUND OF THE INVENTION

1. Field of the Invention

This invention relates to methods of production of an electrode body suitable for use in electricaly molding plastics in a metal mold in which a conductor member of an electrode is inserted.

2. Description of the Prior Art

In this type of electrode body, it is essential that the electrode body be mounted in insulating relation to a can body and that no water leaks occur between the conductor member of the electrode and its insulating support member formed of plastics.

One example of the electrode body of the type described is disclosed in Japanese Patent Application Laid-Open No. 23995/79 which shows an electrode body for use in an atmosphere in which it is brought into direct contact with water, water heated to high temperature and water vapor. The electrode body is produced by injection molding of a resin for forming an insulating support member of plastics on the outer periphery of a conductor member including metal wires. The resin used for forming the insulating support member of plastics is a thermoplastic resin and polyphenylene sulfide resin (hereinafter PPS resin) is favored because it is excellent in heat resistance, water resistant and solvent resistance. The electrode formed by injection molding is mounted on a tank through a male threaded portion formed on the outer peripheral of the electrode and threadably connected to a female threaded portion formed in the tank.

To avoid leakage of water and other material through the interface between the conductive member and the PPS resin, the conductive member has its surface knurled and a coat of a silane compound, particularly epoxycyclohexylalkyltrialkoxysilane, is applied thereto, before the PPS resin is applied thereto by injection molding.

In the example described hereinabove, the injection gate for the PPS resin is positioned radially of the conductor as it is arranged in the electrode body.

By molding plastics through the injection gate arranged in this position, it has been inevitable that leakage occurs between the conductor and its insulating support member formed of PPS resin when the electrode body is produced by the method disclosed in the example referred to hereinabove.

SUMMARY OF THE INVENTION

Object of the Invention

This invention has as its object the provision of a method of production of an electrode body capable of efficiently and positively avoiding leakage that might occur between the conductive member and its insulating support member formed of PPS resin.

STATEMENT OF THE INVENTION

The invention relates to a method of production of an electrode body wherein the electrode body is formed by injection molding by injecting resin into a mold having conductive member of small diameter inserted therein, locating said conductive member being penetrated into said mold, the distance in the radial direction from the surface of the conductive member to the inner surface of the mold being large compared with the diameter of the conductive member, comprising the steps of: the injection gates for injecting resin into said mold being arranged in at least two positions substantially equidistantly spaced apart from each other, all of said injection gates being located to inject the resin substantially parallel to said conductive member and all of said injection gates being positioned substantially on the circumference of an imaginary circle at one axial end only of the conductive member; and injecting the resin through said injection gates.

The outstanding characteristic of the invention is that the injection gates are arranged so that PPS resin is injected into the mold at least in over two positions substantially equidistantly from each other in such a manner that they are substantially parallel to the direction in which the conductor member is located when assembled and substantially on the circumference of an imaginary circle centered at the conductor member.

It has been customary to mount an injection gate radially of the conductor member. The arrangement will be described by referring to FIG. 2 so as to explain why leakage occurs in the electrode body formed by a method of the prior art. According to FIG. 2, showing in a vertical sectional view an electrode body of the same shape as an electrode formed by the method according to the invention, which is produced by the method of the prior art, voids are produced in regions 10 when molding is carried out when an injection gate 9a of the electrode body 1 is positioned as illustrated. During the molding process the resin flows in the direction of the arrow 11 Titanium wires (hereinafter core wires) are provided as small diameter of the conductor member.

In injection molding, the pressure at which injection is performed is generally over about 800 kg/cm$^2$. Since the core wires 2 are of small diameter (1 mm, for example) and the injection gate 9a is located radially, the core wires 2 might be bent by the aforesaid pressure at the time of injection molding. However, so long as the pressure is not high enough to cause plastic deformation to occur, the core wires 2 tend to return to their original positions upon release of the injection pressure oriented in one direction when injection is completed. At this time, the resin has already started curing and the return movement of the core wires 2 would disrupt the adhesion of the resin to the core wires 2. Thus when hydrostatic water is applied to the electrode body 1, water would leak through the gap between the core wires 2 and the resin 3.

As shown by arrows 11 in FIG. 2 the resin flows along the surface of a metal mold, at the time of injection molding. This causes entrainment of the air in the metal mold in the central portion of the electrode body 1, and the resin density around the core wires 2 in the center shows a reduction, with the result that shrinkage of the resin occurs when it cools. Thus as designated by the numeral 10 in FIG. 2, a conspicuous void region is produced around the core wires 2, and the area and the force for the resin to adhere to the core wires 2 are reduced by the generation of the voids in the vicinity of the core wires 2. The result of this is that leakage of water occurs through the gap between the resin and the core wires 2.

When the injection gate is arranged obliquely as indicated at 9b or in an axial direction as indicated at 9c, the return movement of the core wires 2 would also disrupt the adhesion of the resin to the core wires 2 as is the case with the product obtained with the injection gate located radially as described hereinabove, because only one injection gate is located in one position although the phenomenon might be reduced due to a variation in position. Even if the position of the injection gate is varied, the flow of the resin will remain substantially unchanged, and there is still the risk of leakage of water occurring.

DESCRIPTION OF THE PREFERRED EMBODIMENTS

The invention will now be described by referring to the embodiment shown in the accompanying drawings.

Figure 1:
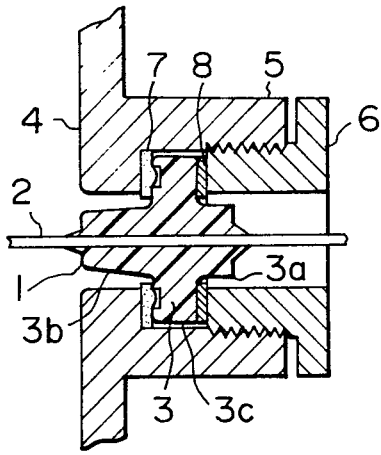
FIG. 1 is a vertical sectional view showing the manner in which the electrode body comprising one embodiment of the invention is mounted in position.
Figure 2:
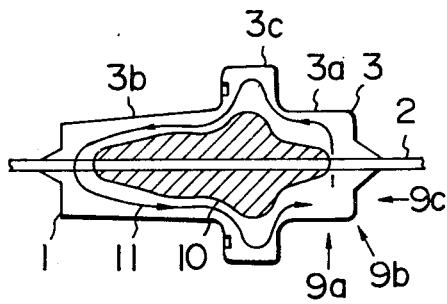
FIG. 2 is a vertical sectional view of an electrode body formed by a method of production of the prior art.
Figure 3:
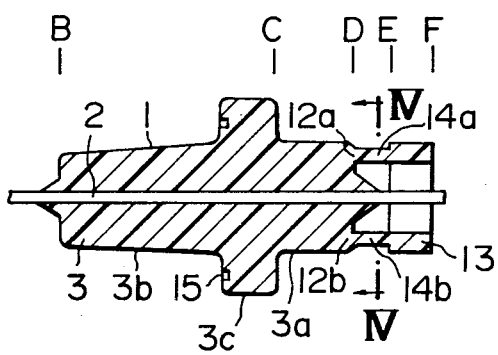
FIG. 3 is a vertical sectional view of the electrode body produced by the method according to the invention, shown immediately after being formed and still having the resin filling the resin introducing passageway connected thereto.
Figure 4:
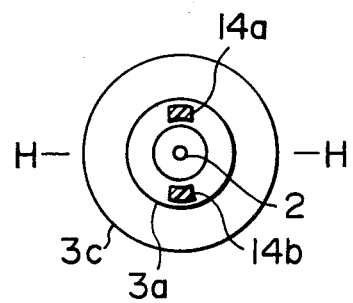
FIG. 4 is a sectional view taken along the line IV—IV in FIG. 3.

Referring to FIG. 1, an electrode body 1 comprises core wires 2, serving as a conductive member, and a resin 3 for supporting the core wires 2 in insulating and watertightly sealing relation. The electrode body 1 is formed by injecting a resin into a metal mold in which the core wiresa washer 8 of sheet steel.

The core wires 2 are titanium wires of small diameter (1 mm, for example), and the resin 3 is PPS resin.

Referring to FIGS. 3 and 4, 12a and 12b designate position of injection gates the injection gates are located in positions which are in the vicinity of the periphery with respect to a radial direction of said one axial end of the mold and are symmetrical with respect to the core wire 2 located in the center axis of the resin 3. Moreover, FIG. 5 shows schematically the injection gates 12a, 12b for injecting resin into the mold. 13 designates the position of an annular resin introducing passageway communicating with a main passageway, not shown, located radially. 14a and 14b designate the position of branch resin introducing passageways connecting the resin introducing passageways 13 to the A recess 15 is provided for fitting a packing (not shown) therein.

The metal mold for forming the electrode body 1 comprises four mold members including a mold member for forming a flange 3c and a shaft portion 3b leftwardly of a line C, two movable mold members separated radially along a line H—H for forming a shaft portion 3a and the outer portions of the branch resin introducing passageways 14a and 14b disposed between lines C and E, and a mold member for forming the outer surface of the resin introducing passageway 13 between lines E and F and the inner surface of the resin introducing passageway 13 and the inner surfaces of the branch resin introducing passageways 14a and 14b between lines D and F.

Figure 5:
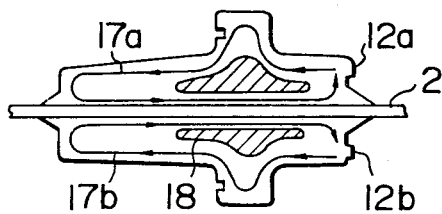
FIG. 5 is a vertical sectional view of an electrode including the electrode body formed according to the invention.

Upon completion of forming, the molded product is severed at the portion of the resin filling the branch resin introducing passageways 14a and 14b from the resin filling the resin introducing passageway 13, to produce a finished electrode shown in FIG. 5.

In the aforesaid construction, the electrode body 1 is formed by introducing resin through introducing passageways parallel to the core wires 2 in positions symmetrical with respect to the core wires 2 located in the center axis of the electrode body 1. This is conductive to prevention of bending of the core wires 2, so that no reduction in the force with which the resin 3 adheres to the core wires 2 occurs which might be caused by the return movement of the core wires 2. The distance in the radial direction from the surface of the core wires 2 to the inner surface of the mold being large compared with the diameter of the core wire 2. The flow of the resin obtained at the time of forming is indicated by arrows 17a and 17b in FIG. 5 in which streams of resin released from the injection gates 12a and 12b, respectively, flow along the surface of the mold in a direction opposite the injection gates and unite with each other at the forward end of a portion opposite the injection gates into a single stream which flows back toward the injection gates 12a and 12b. Thus, voids which might be produced by entrainment of air in the mold or molding sink of the resin occurring when the resin cools are confined to a region intermediate the core wires 2 and the surface of the mold as indicated by the voids 18 in FIG. 5. The region of the voids 18 is located essentially in the intermediate portion of the molded electrode member. Thus, the development of voids in the vicinity of the core wires 2 exerting great influences on watertightly sealing the core wires 2 can be effectively reduced, so that the force with which the resin adheres to the core wires 2 can be greatly increased.

When electrode bodies were produced by methods of the prior art, they effectively provided a watertight seal to the electrode wires 2 when tested with a hydrostatic pressure of 17.5 kg/cm$^2$. However, some of them developed water leaks when subjected to hydrostatic pressure tests (with a hydrostatic pressure of 2 kg/cm$^2$) after having been repeatedly heated and cooled at temperature between 10° and 90° C. It has been revealed, however, that no water leaks developed in the electrode bodies 1 formed by the method according to the invention, even if tests were conducted after they have been repeatedly heated and cooled.

One example of the conditions under which forming of the electrode body is carried out will be described. The length of the resin 3 between lines B and D in FIG. 3, 24 mm; the length of the shaft portion leftwardly of line B, 12 mm; the thickness of the flange 3c, 4.5 mm; the outer diameter of the shaft portion 3a, 9 mm; the outer diameter of the flange 3c, 16 mm; the outer diameter of the forward end of the shaft portion 3b, 7 mm; and the outer diameter of the root of the shaft portion 3b, 9 mm. The injection gates 12a and 12b have a height of 1.5 mm and a width of 2 mm as seen radially with the point spaced apart radially from the center of the core wires 2 a distance of 3 mm being used as the center. The core wires 2 are obtained by subjecting titanium wires of 1 mm in outer diameter to sandblast treatment and then to cleansing treatment. Resin is injected at an injection pressure of 1000 kg/cm$^2$ through the injection gates 12a and 12b, and the product is withdrawn from the metal mold after lapse of 50 to 60 seconds. The mold temperature is substantially normal and the resin temperature is also substantially normal. The core wires 2 are plated with platinum only in those portions which are brought into contact with water and portions thereof in the resin have no platinum coating.

The PPS resin used is produced by Hodogaya Chemical Company, Ltd. and has a trade name G6. The resin has incorporated therein as reinforcing material 40% of glass rods (10 μm in diameter and 1-3 mm in length) and 20% of glass balls.

In performing sandblast treatment, titanium wire is cut into lengths of about 50 mm each which are the lengthwise dimension of the core wires 2 in the electrode, and placed in suitable number (500 wires, for example) in a vessel having rubber lining to be ground with grinding stones of 0.5-1.0 mm in a diameter, to produce wires free from bending and having a predetermined surface roughness (15-35 μm). This enables titanium wires of small diameter free from bending to be obtained in large quantities. The provision of the titanium wires free from bending facilitates insertion of the core wires in the mold. The sandblast treatment offers the additional advantage of being able to sever or revmove longitudinally damaged portions formed in the titanium wires when the latter are elongated, so that the force with which the resin adheres to the core wires at the time of forming can be increased. When the longitudinally damaged portions have cracks extending through the wires radially from side to side, water would leak therethrough. When the aforesaid length of the core wires is not enough to provide portions of the core wires in contact with water with a predetermined surface area, additional core wires are joined by spot welding to the core wires in the electrode body after the latter is formed by injection molding.

Generally, it is usual practice to apply a coat of a coupling agent to the metal member to be inserted in molded resin before the metal member is placed in a metal mold, with the hope that the adhesive strength between the resin and the metal member would be increased. However, in the method according to the invention, no coupling agent had better be used. A silane base coupling agent does not react with PPS resin, although it enhances the adhesive strength between the resin and the core wires. However, the silane base coupling agent would undergo a change at the time of forming and become soluble in water, so that leakage of water would occur in the electrode body with time after it has been formed by injection molding. It has been found that other coupling agents, such as a titanium base coupling agent, a chrominum base coupling agent, etc., cause water to leak between the resin and the core wires 2 when such coupling agent is used in combination with PPS resin.

In the embodiment shown and described hereinabove, the injection gates have been described as being two in number. However, it goes without saying the use of a large number of injection gates is desirable, in view of the fact the directionality of the force exerted on the core wires 2 can be further reduced. Also, the injection gates have a rectangular cross-sectional shape, but they may be circular in cross section.

I claim:

1. A method of production of an electrode body wherein the electrode body is formed by injection molding by injecting resin into a mold having a conductive member of small diameter located therein, the distance in the radial direction from the surface of the conductive member to the inner surface of the mold being large compared with the diameter of the conductive member, comprising the steps of:

arranging the injection gates for injecting resin into said mold in at least two positions substantially equidistantly spaced apart from each other, all of said injection gates being located to inject the resin substantially parallel to said conductive member and all of said injection gates being positioned substantially on the circumference of an imaginary circle at one axial end only of the conductive member; and injecting the resin through said injection gates.

2. A method of production of an electrode body according claim 1, wherein said injection gates are located in a position which are in the vicinity of the periphery with respect to a radial direction of said one axial end of the mold.

3. A method of production of an electrode body according to claim 1, comprising the further step of sandblasting the conductive member prior to locating the conductive member in the mold, and wherein said conductive member is sandblasted by inserting said conductive member in a casing and grinding said conductive member with grinding stones.

4. A method of production of an electrode body according to claim 1, wherein said resin has incorporated therein reinforcing material.

5. A method of production of an electrode body according to claim 4, wherein said reinforcing material is glass rods and glass balls.

6. A method of production of an electrode body according to claim 1, wherein said conductive member of small diameter is titanium wire.

7. A method of production of an electrode body according to claim 3, wherein said conductive member of small diameter is cut into an appropriate length prior to sandblasting.

8. A method of production of an electrode body according to any one of claims 1 to 7, wherein said conducting member located in said mold has no coupling agent coated on the surface of said conductive member.

9. A method of production of an electrode body according to any one of claims 1 to 7, wherein said resin is PPS resin.

* * * * *